Patented May 29, 1951

2,555,221

UNITED STATES PATENT OFFICE 2,555,221

METHOD OF RECOVERING TERPENE POLYMER AND COPOLYMER RESINS

Samuel G. Burroughs, Pittsburgh, Pa., assignor to Pennsylvania Industrial Chemical Corporation, Clairton, Pa., a corporation of Pennsylvania No Drawing. Application September 2, 1949, Serial No. 113,897

2 Claims. (Cl. 260—93.3)

This invention relates to a dehalogenation method of recovering clean, light colored terpene resins and terpene copolymer resins from the solutions in which the resin polymers are formed.

In the resin forming polymerization and copolymerization of various of the terpenes responding to the general formula $C_{10}H_{16}$ polymerization is in usual practice performed under the stimulus of a metal halide of the acid-reacting Friedel-Crafts type, typically aluminum chloride. The others of the metal chlorides belonging to the defined class, such as stannic chloride, ferric chloride, titanium chloride and the like, similarly leave residual chlorine in the solutions of resin polymers formed under the stimulus which they provide. Disadvantageous results are caused by the retention of residual chloride in the solution of polymers resulting from the polymerizing reaction. This residual chlorine has a corrosive effect on the metal equipment in which the resin solution is subjected to distillation for the recovery of solid resin; this corrosive effect results in darkening the resin and in the inclusion of dark specks in the resin. These results by detracting substantially from the utility of the resins produced present a serious disadvantage.

Comparative tests were made on samples of terpene polymer and terpene copolymer solutions polymerized with aluminum chloride in which the samples were distilled respectively in an iron vessel and in a glass vessel and then were checked for chlorine by the Beilstein copper wire test. These tests showed that the distillation in metal equipment reduced the chlorine content of the resin. In commercial practice it is this dechlorinating effect of iron stills and condensers which causes darkening and specks in what otherwise would be a clear unblemished resin.

It is a fact that the generally practiced steps of neutralization and washing and also purification by clay filtering are ineffective to free the resin solution of chlorine. Other methods which have been utilized or proposed while effective in varying order in freeing the polymer solution of chlorine result in substantial depolymerization of the polymers in the solution, thus resulting in decreased yield and lowered softening point of the product resin, or resulting in both those undesired results. This is true particularly of a treatment of terpene polymer and copolymer solutions with magnesium oxide or zinc oxide whether or no those metal oxides be accompanied by fuller's earth. Some dechlorination processes serve of themselves to darken the resin.

I have discovered that if a solution of terpene polymers or copolymers be subjected at moderately elevated temperature and without acid drowning or water washing to the action of calcium oxide or hydroxide, i. e. "lime," the solution is rendered free of chlorine by the Beilstein copper wire test with a minimum of depolymerization. Such dechlorinated polymer solutions when distilled for resin recovery in a metallic still, such as an iron still, yield clear, hard resin polymers which are free from specks without substantial loss in either yield or softening point attributable to depolymerization.

To exemplify the dehalogenation procedure as performed on the polymerization product of a commercial grade of beta-pinene the following is given:

Example 1

The polymerization product subjected to dechlorination involved the polymerization of a good commercial grade of beta-pinene about 85% to 90% pure distilling at a vapor temperature within the range of 159° C. to 166° C. For polymerization 275 cc. of this beta-pinene was blended with 350 cc. of Stoddard solvent naphtha which is a petroleum solvent distilling at a vapor temperature within the approximate range of 150° C. to 180° C. This dilute beta-pinene was agitated with aluminum chloride in an amount equal to 5% the weight of the beta-pinene at a temperature within the approximate range of 40° C. to 45° C. for a total polymerization period of about three hours.

After polymerization the polymer solution was allowed to settle and was decanted away from the aluminum chloride sludge. The decanted solution was mixed with 6 gm. of calcium hydroxide (hydrated lime) and 6 gm. of fuller's earth. The mixture was refluxed and distilled off up to a still temperature of 160° C. to remove most of the added solvent. The polymer solution was then refluxed at a still temperature of 160° C. for a period of 7½ hours, was filtered away from the fuller's earth and sludge and the filter cake was washed with 100 cc. of petroleum naphtha which was added to the solution.

The filtrate was distilled to a still temperature of 210° C. and was steam distilled while raising the still temperature to 260° C. It was held at 260° C. to a point at which hard resin polymers were recovered, while collecting the distillate over 200 cc. of water.

There was recovered by distillation 174 gms. of hard resin having a softening point of 124.5° C. (ball and ring). During the final distillation for resin recovery the acidity as collected in water amounted to 4 cc. of N/10 NaOH showing that the polymer solution subjected to distillation contained a minimum of chlorine. The recovered resin gave a negative indication for the presence of chlorine by the Beilstein copper wire test. The color of the hard resin was below G–1.

It may be explained that if terpene polymer solutions contain chlorine they give off hydrochloric acid during steam distillation at 260° C. A resin similarly polymerized but which was not dechlorinated showed a marked acidity during distillation and after distillation the solid resin gave a positive indication for the presence of chlorne by the Beilstein test. It may also be explained that this test is accurate to 0.2% for the presence of chlorine.

*Example 2*

The polymerization procedure of Example 1 was duplicated and the dechlorination procedure was duplicated save that calcium oxide (quick lime) was used instead of hydrated lime. During steam distillation the polymer solution gave off a distillate showing the presence of HCl equivalent to 2 cc. N/10 NaOH. Hard resin was recovered in a yield of 170 gms. and at a softening point of 124° C. (ball and ring).

It may be noted that the yield and softening point of the terpene resin recovered in Examples 1 and 2 is such as to indicate but little if any depolymerization attributable to the dechlorination procedure. Analogous plant runs in which beta-pinene from the same stock was polymerized without dechlorination gave about 3% higher yield of resin having a softening point of 124° C. (ball and ring). The color of the hard resin was G–1.

For purposes of comparison similar runs were made using all the materials and proportions given in Example 1 except that magnesium oxide and zinc oxide respectively were used in place of the hydrated lime of that example as follows:

*Example 3 (comparative)*

The materials and procedure of Example 1 were used identically, save that 6 gms. of chemically pure magnesium oxide was used instead of the hydrated lime. The HCl taken over in steam distillation for the recovery of hard terpene resin was equivalent to 9 cc. N/10 NaOH. The resin gave a negative indication for the presence of chlorine by the Beilstein test. The yield of hard terpene resin was 155 gms. of resin having a softening point of 118° C. (ball and ring). This indicates a loss by depolymerization equal to 12.6% taking the results of Example 1 as a standard. The color of the hard resin was G–2.

The materials and procedure of Example 1 again were duplicated save that 6 gms. of chemically pure zinc oxide was used instead of the hydrated lime. The HCl taken over in steam distillation for the recovery of hard terpene resin was equivalent to 1 cc. N/10 NaOH. The resin gave a negative indication for the presence of chlorine by the Beilstein test. The yield of hard terpene resin was 160 gms. of resin having a softening point of 120° C. (ball and ring). This indicates a loss by depolymerization equal to 8.6% taking the results of Example 1 as a standard. The color of the resin was G–5.

The above comparative example illustrates a difference in the depolymerization effects incurred by the respective use of fuller's earth and lime and fuller's earth with either magnesium oxide or zinc oxide which clearly shows the superiority attendant upon use of lime when the procedure is translated into terms of large volume plant operations.

*Example 4*

A blended starting material was made by blending 138 cc. of beta-pinene of the same stock used in the preceding example with 138 cc. rearranged alpha-pinene and 350 cc. of the same petroleum naphtha used in the preceding examples. It may be explained that the rearranged alpha-pinene consists of a blend of dl-limonene and camphene. The rearranging operation and polymerization were conducted in accordance with the method disclosed in the application of Frank W. Corkery and Samuel G. Burroughs Serial No. 37,305, filed July 6, 1948, now U. S. Patent 2,483,124. Briefly to describe that method, it consists in the production of hard terpene resin polymers from alpha-pinene by treating the said alpha-pinene with fuller's earth having a pH value of 5.5 to 6.6 inclusive which has been heat-treated to from 5 to 30 minutes at a temperature of from 225° C. to 300° C. to bring the said alpha-pinene by molecular rearrangement to an A. S. T. M. D611–46T aniline point between 35° C. and 38.5° C. inclusive while controlling the reaction to a rate of aniline point drop no greater than 1.2° C. per hour.

Polymerization was conducted in a manner identical with that described in Example 1. The polymerization was repeated on identical quantities of the same materials using identical conditions and the polymer solution similarly was settled and decanted.

One portion of polymer solution was distilled to 210° C. and was steam distilled at 260° C. without dechlorination. The HCl content of the distillate was 290 cc. N/10 NaOH. The yield was 177 gms. of hard resin having a softening point of 105° C. (ball and ring).

The other portion was treated as in Example 1 by refluxing it with 10 gms. of fuller's earth and 10 gms. of calcium hydroxide. After filtration as in Example 1, the polymer solution was distilled to 160° C. and was steam distilled to 260° C. During distillation the polymer solution gave off HCl equivalent to 1.5 cc. N/10 NaOH. The yield of resin was 180 gms. of hard resin having a softening point of 103° C. (ball and ring). The resin gave a negative indication for the presence of chlorine by the Beilstein test. The hard resin was color G–1.

The above example thus is exemplary of the dechlorination of a beta-pinene, dl-limonene and camphene, terpene copolymer solution. The method of dechlorination also was practiced on copolymers of terpenes with unsaturates other than terpenes. These dechlorinations may be exemplified as follows:

*Example 5*

Beta-pinene from the same source that was used in Example 1 and the other preceding examples was polymerized with a pentadiene cut of distillate from the cracking of petroleum, which cut boils within the approximate range of 40° C. to 75° C., vapor temperature. The starting liquid was made up of 141 gms. of the beta-pinene, 90 gms. of the pentadiene cut and 300 cc. of toluol. Polymerization was conducted as in Example 1.

The polymer solution so formed was treated as in Example 1, by refluxing it with 15 gms. of fuller's earth and 15 gms. of calcium hydroxide.

The polymer solution was distilled to 160° C., still temperature. Refined solvent naphtha from coke oven light oil in the amount of 250 cc. was added to replace the more volatile toluol and the solution was refluxed for 2 hours at 160° C. After filtration as in Example 1, the polymer solution was distilled to 160° C. and was steam distilled to 260° C. During distillation no perceptible HCl came over. The resin gave a negative indication for the presence of chlorine by the Beilstein test.

Hard resin was recovered by distillation in a yield of 203 gms. of resin having a softening point of 118° C. (ball and ring). This was within 1% of the yield and 1° C. of the softening point of similar resins which had not been subjected to dechlorination. The hard resin was color G–2.

*Example 6*

The following dechlorination was practiced on solutions containing the copolymers of various terpenes with vinyl cyclohexene responding to the formula:

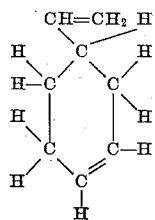

These terpenes were (a) alpha-pinene, (b) beta-pinene, (c) dl-limonene, (d) rearranged alpha-pinene (dl-limonene and camphene) as described above, (e) camphene, (f) gum spirits of turpentine, (g) sulphate turpentine.

In each of the polymerizations the starting liquid was made up by mixing 180 cc. of the terpene with 120 cc. of the vinyl cyclohexene and 500 cc. of toluol. In each polymerization which was conducted in general accordance with the procedure of Example 1, 20 gms. of aluminum chloride was used, the polymerization was conducted within the approximate range of 40° C. to 45° C. and the polymer solution was allowed to settle and was decanted away from the sludge after polymerization was completed.

After polymerization and decantation the solution was distilled to 160° C., still temperature, and 250 cc. of refined solvent naphtha from coke oven light oil was added to replace the more volatile solvent which had been distilled off. 20 gms. of calcium hydroxide and 20 gms. fuller's earth then were added and the polymer solution was refluxed at 160° C. for 7½ hours and was filtered, as in Example 1.

The filtered polymer solution was then distilled to 160° C. and was steam distilled at 260° C. as in Example 1. In each run the hard resin was recovered by distillation. No HCl was given off in any of the runs and in every run the recovered resin gave a negative indication for the presence of chlorine by the Beilstein test. The hard resins varied in color from color G–3 to color G–6.

Check tests show that in no run of Example 6 was the yield of resin more than 2% lower than was obtained without dechlorination and in no run was the softening point more than 3° C. lower than obtained without dechlorination. Using the above runs as a standard, dechlorination conducted replacing the lime with magnesium oxide or zinc oxide gave substantially lower yields and softening points, indicating that substantial dechlorination had occurred. The use of zinc oxide additionally resulted in the recovery of a much darker resin.

It is important that the dechlorination procedure of my method be conducted under anhydrous conditions. Thus the polymer solution which is treated is neither drowned with dilute acid nor washed with water at the end of polymerization but is simply allowed to settle and is decanted away from the chloride sludge. Under the anhydrous conditions of the process no acidity is developed during the progress of the dechlorination distillation, and the dechlorination therefore gives a polymer solution free or approximately free of acid. It is to be understood that although each example specifies distillation with reflux, reflux is not essential, provided the polymer solution be brought into intimate contact with the fuller's earth and lime at moderately elevated temperature for a period of time to insure such contact. If refluxing is omitted the dechlorination is performed with retarded distillation, which distillation is of course followed by separation and distillation for resin recovery. In each instance whether or no reflux be practiced during the dechlorination mechanical agitation is used to keep the fuller's earth and lime in suspension and maintain good contact with the polymer solution. I have found that with either straight distillation or reflux distillation the proper temperature for the dechlorination is within the approximate range of 155° C. to 175° C. If the temperature of treatment be decreased from 155° C. to 150° C. the process becomes progressively less effective; and as the temperature of treatment is increased from 175° C. to 180° C. depolymerization progressively increases.

Also although filtration is included in each example as the step by which the polymer solution is separated from fuller's earth and sludge after the dechlorination treatment and filtration is preferred practice, separation can be effected in some other manner, as by decantation.

As to the quantity of fuller's earth and lime which are used there is no specific limitation, it being essential that both be present in such quantity that the polymer solution is brought completely into intimate contact with them. From the practical viewpoint I have found that below 1% each of the fuller's earth and lime requires an extended time of treatment in order to bring both into intimate contact with the polymer solution and that more than 10% of each tends to cause mechanical difficulties as well as agglomeration and clogging during the treatment. The fuller's earth and the lime are powdered before use. The more finely divided the fuller's earth and lime are, the less the quantity that need be used to give good contact with the solution. Desirably the lime used is of a pure grade which contains a minimum of magnesium. The fuller's earth is a natural fuller's earth used without acid treatment and thus is but mildly acidic. Such fuller's earth usually has a pH value of from 6 to 7 as indicated by agitating the fuller's earth with an equal weight of water and testing with Cargille pH paper.

My method results in freeing the resin of any substantial content of chlorine thus preventing the development of acidity in the resin and retarding color development in it. Because the polymer solution is free of any defective content of chlorine or hydrochloric acid during distillation for resin recovery that operation does not result in corrosion of metal distillation equipment, with consequent darkening and the inclusion of dark specks in the hard resin which is recovered.

In any place in which parts or percentages are given herein without qualification it is to be understood that the reference is to parts or percentages by weight. In any place herein in which temperature is given without qualification it is to be understood to be still temperature which is indicated. In any place herein in which softening point of a resin is given without qualification it is to be understood as softening point determined by the A. S. T. M. E28-42T ball and ring method. In any place in which aluminum chloride is mentioned without qualification that catalyst is to be assumed to be anhydrous. In defining the color of the recovered resins by the symbol "G," it is the Gardner Standards—1933—and not the Gardner-Holdt scale which is intended.

I claim as my invention:

1. The method of recovering hard terpene resin and terpene copolymer resin free from included specks and chlorine contamination from terpene polymer and copolymer solutions contaminated by chlorine from polymerization with an acid-acting metal chloride catalyst, by agitating a said polymer solution in contact with fuller's earth and lime at a temperature within the approximate range of 155° C. to 175° C. under anhydrous conditions, separating the said polymer solution so treated from fuller's earth and lime sludge, and recovering hard resin polymers from the said polymer solution by distillation.

2. The method of recovering hard terpene resin free from included specks and chlorine contamination from beta-pinene polymer solutions contaminated by chlorine from polymerization with an acid-acting metal chloride catalyst, by agitating a said polymer solution in contact with fuller's earth and lime at a temperature within the approximate range of 155° C. to 175° C. under anhydrous conditions, separating the said polymer solution so treated from fuller's earth and lime sludge, and recovering hard resin polymers from the said polymer solution by distillation.

SAMUEL G. BURROUGHS.

REFERENCES CITED

The following references are of record in the file of this patent:

UNITED STATES PATENTS

| Number | Name | Date |
|---|---|---|
| 2,060,404 | Thomas et al | Nov. 10, 1936 |
| 2,264,774 | Sheehan | Dec. 2, 1941 |